US008890854B2

(12) United States Patent
Tenuta et al.

(10) Patent No.: US 8,890,854 B2
(45) Date of Patent: Nov. 18, 2014

(54) TOUCH SENSOR PANEL CALIBRATION (75) Inventors: Matthew D. Tenuta, San Jose, CA (US); Louis W. Bokma, San Jose, CA (US)

(73) Assignee: Apple Inc., Cupertino, CA (US)

(*) Notice: Subject to any disclaimer, the term of this patent is extended or adjusted under 35 U.S.C. 154(b) by 835 days.

(21) Appl. No.: 12/950,981

(22) Filed: Nov. 19, 2010

(65) Prior Publication Data

US 2012/0050229 A1 Mar. 1, 2012

Related U.S. Application Data (60) Provisional application No. 61/377,828, filed on Aug. 27, 2010.

(51) Int. Cl.
*G06F 3/041* (2006.01)
*G06F 3/045* (2006.01)
*G06F 3/044* (2006.01)
*G01R 27/26* (2006.01)

(52) U.S. Cl.
CPC .............. *G06F 3/0418* (2013.01); *G06F 3/044* (2013.01)
USPC .......... 345/178; 345/173; 324/658; 178/18.06

(58) Field of Classification Search
USPC ........................................................ 345/178
See application file for complete search history.

(56) References Cited

U.S. PATENT DOCUMENTS

| 5,483,261 A | 1/1996 | Yasutake |
| 5,488,204 A | 1/1996 | Mead et al. |
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 7,986,181 B2 * | 7/2011 | Confalonieri et al. ........ 327/553 |
| 8,040,142 B1 * | 10/2011 | Bokma et al. ................. 324/658 |

(Continued)

FOREIGN PATENT DOCUMENTS

| JP | 2000-163031 A | 6/2000 |
| JP | 2002-342033 A | 11/2002 |

OTHER PUBLICATIONS

Anonymous. (Jul. 24, 2009). "PSoC® CY8C20x66, CY8C20x66A, CY8C20x46/96, CY8C20x46A/96A, CY8C20x36, CY8C20x36A Technical Reference Manual (TRM)," *Cypress Semiconductor*, Document No. 001-22219 Rev. *D, 310 ppages.

(Continued)

*Primary Examiner* — Alexander S Beck
*Assistant Examiner* — Mihir Rayan
(74) *Attorney, Agent, or Firm* — Morrison & Foerster LLP (57) ABSTRACT A method for calibrating a touch sensor panel including a plurality of touch electrodes is provided. The method includes determining, for each of the plurality of touch electrodes, a contribution in terms of capacitance to a total capacitance of the touch sensor panel; and allocating a fraction of a fixed period of time for measuring a capacitance of each of the plurality of electrodes based on the electrode's contribution to the total capacitance.

19 Claims, 7 Drawing Sheets

(56) References Cited

U.S. PATENT DOCUMENTS

| | | | |
|---|---|---|---|
| 8,072,230 B1* | 12/2011 | Seguine | 324/672 |
| 8,479,122 B2 | 7/2013 | Hotelling et al. | |
| 2006/0026521 A1 | 2/2006 | Hotelling et al. | |
| 2006/0197753 A1 | 9/2006 | Hotelling | |
| 2007/0062739 A1 | 3/2007 | Philipp et al. | |
| 2007/0074913 A1* | 4/2007 | Geaghan et al. | 178/18.06 |
| 2008/0158167 A1* | 7/2008 | Hotelling et al. | 345/173 |
| 2008/0309627 A1* | 12/2008 | Hotelling et al. | 345/173 |
| 2010/0302198 A1 | 12/2010 | Tasher et al. | |
| 2011/0156839 A1* | 6/2011 | Martin et al. | 333/172 |
| 2011/0163766 A1* | 7/2011 | Geaghan | 324/678 |
| 2011/0206017 A1* | 8/2011 | Taghavi Nasrabadi et al. | 370/336 |
| 2011/0216031 A1* | 9/2011 | Chen et al. | 345/174 |
| 2012/0050213 A1* | 3/2012 | Bokma | 345/174 |
| 2013/0106779 A1* | 5/2013 | Company Bosch et al. | 345/174 |

OTHER PUBLICATIONS

Anonymous. (Oct. 20, 2009). "CapSense Sigma-Delta Data Sheet," *Cypress Semiconductor Corporation*, Document Number: 001-45840 Rev. *D, 41 pages.

Lee, M. (Aug. 29, 2008). "Design Guide—CapSense™ Buttons with CSD: AN47456," *Cypress Semiconductor*, Document No. 001-47456 Rev. *A, pp. 1-6.

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Non-Final Office Action mailed Dec. 17, 2013, for U.S. Appl. No. 12/950,693, filed Nov. 19, 2010, 16 pages.

Non-Final Office Action mailed Jun. 13, 2014, for U.S. Appl. No. 12/950,693, filed Nov. 19, 2010, 13 pages.

* cited by examiner

TOUCH SENSOR PANEL CALIBRATION

CROSS-REFERENCE TO RELATED APPLICATIONS

This application claims the benefit of U.S. Provisional Application No. 61/377,828 filed Aug. 27, 2010, the contents of which are incorporated by reference herein in their entirety for all purposes.

FIELD

This relates generally to capacitive sensing of touches on a touch sensor panel, and more particularly, to calibrating touch sensor panels during the fabrication and evaluation process to achieve uniform touch sensitivity among a population of touch sensor panels.

BACKGROUND

In recent years, touch sensor panels, touch screens, and the like have become available as input devices. Touch screens, in particular, are becoming increasingly popular because of their ease and versatility of operation as well as their declining price. Touch screens can include a touch sensor panel, which can be a clear panel with a touch-sensitive surface, and a display device, such as an LCD panel, that can be positioned partially or fully behind the touch sensor panel or integrated with the touch sensor panel so that the touch-sensitive surface can cover at least a portion of the viewable area of the display device. Touch screens can allow a user to perform various functions by touching (or nearly touching) the touch sensor panel using one or more fingers, styli or other objects at a location often dictated by a user interface (UI) being displayed by the display device. In general, touch screens can recognize a touch event and the position of the touch event on the touch sensor panel, and a computing system can then interpret the touch event in accordance with the display appearing at the time of the touch event, and thereafter can perform one or more actions based on the touch event.

The touch sensor panel can be constructed as an array of touch electrodes and/or pixels, each electrode or pixel capable of sensing a touch event (one or more touches or near-touches) occurring at the location of the electrode or pixel. To determine the locations of one or more touch events, a scan of the touch sensor panel can be performed during which time one or more pixels or electrodes can be evaluated in sequence for touch event activity until an "image" of touch is obtained for the entire panel.

However, depending on the design of the touch sensor panel, the electrodes of a particular panel may have different intrinsic capacitances due, for example, to being different in size and shape and being connected to a touch controller with routing traces of different lengths (i.e., the series resistance of the traces may vary based on their length). As a result, touch sensitivity of the touch panel sensor may not be uniform everywhere on the panel. In addition, changes in temperature and/or humidity can also affect the sensitivity of the touch sensor panel. Without proper calibration, touch sensor panels may not always perform as expected in some conditions.

SUMMARY

This relates to calibrating touch sensor panels to achieve uniform touch sensitivity on a particular touch sensor panel and among a population of touch sensor panels. In various embodiments, the calibration process can include setting up one or more scanning parameters to maximize the signal-to-noise ratio (SNR) within a period of time during which the touch sensor panel can be scanned. In other embodiments, an optimal switching rate can be determined during the calibration process to ensure that changes in external operating conditions such as temperature and humidity do not significantly affect the performance and sensitivity of the touch sensor panels.

DETAILED DESCRIPTION

In the following description, reference is made to the accompanying drawings which form a part hereof, and in which it is shown by way of illustration specific embodiments which can be practiced. It is to be understood that other embodiments can be used and structural changes can be made without departing from the scope of the embodiments of this disclosure.

This relates to calibrating touch sensor panels to achieve uniform touch sensitivity on a particular touch sensor panel and among a population of touch sensor panels. In various embodiments, the calibration process can include setting up one or more scanning parameters to maximize the signal-to-noise ratio (SNR) within a period of time during which the touch sensor panel can be scanned. In other embodiments, an optimal switching rate can be determined during the calibration process to ensure that changes in external operating conditions such as temperature and humidity do not significantly affect the performance and sensitivity of the touch sensor panels.

Although embodiments of the disclosure may be described herein with respect to self-capacitance touch sensor panels (for which a touch on an electrode or pixel typically can cause an increase in capacitance of the sensing electrode to panel or system ground), embodiments of the disclosure are not so limited, but can include mutual capacitance touch sensor panels (for which a touch on the panel can cause an increase in capacitance between two neighboring electrodes). Those skilled in the art will understand that the circuitry described and illustrated herein can be easily modified to detect faster charging times and more counts in a given evaluation period as indicators of a touch event. In addition, although embodiments of the disclosure may be described herein with respect to touch sensor panels and touchscreen devices, the capacitive sensing embodiments described herein are not so limited, and can be used for many types of capacitive sensing measurements.

Figure 1:
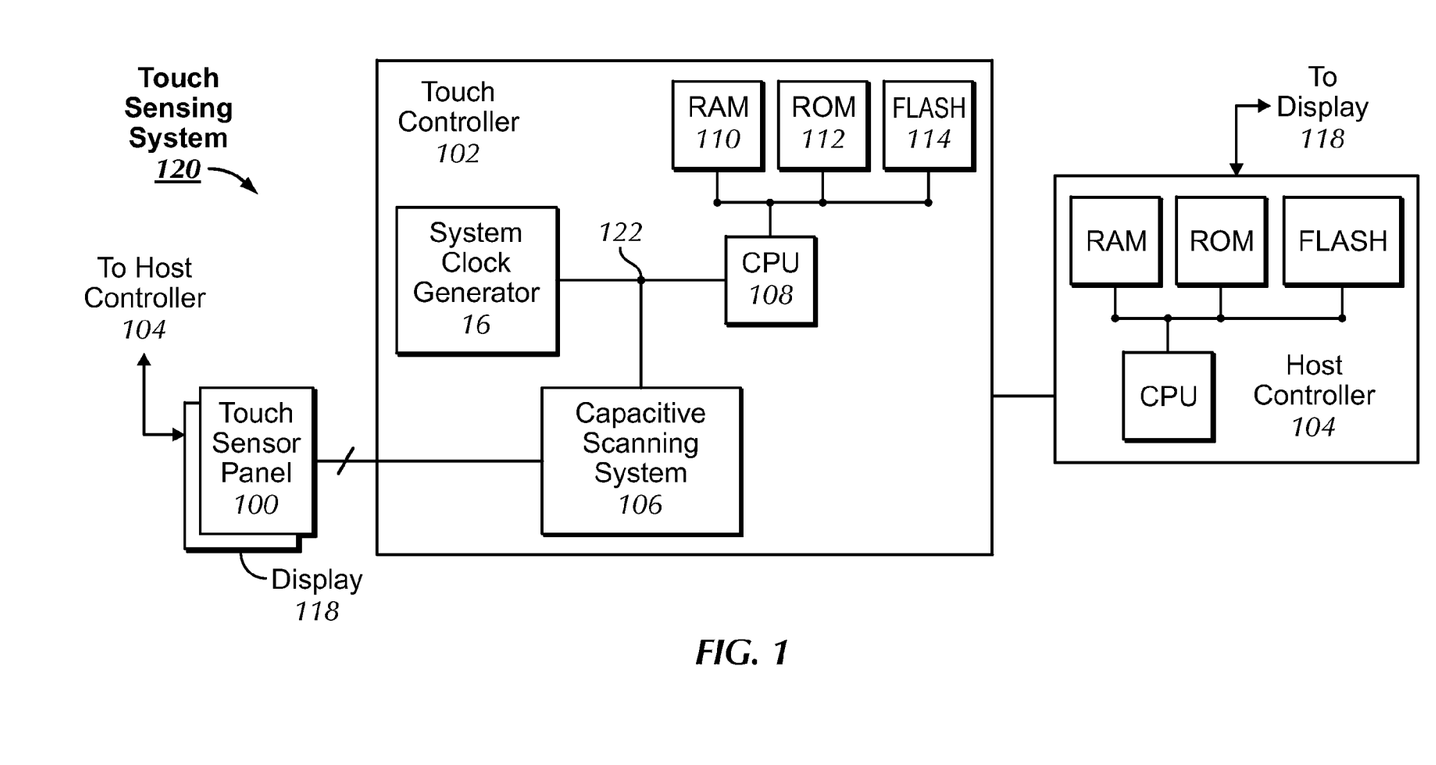
FIG. 1 illustrates an exemplary touch sensing system according to embodiments of the disclosure.

FIG. 1 illustrates an exemplary touch sensing system 120 according to some embodiments of the disclosure. In the example of FIG. 1, touch controller 102 can be coupled to touch sensor panel 100 and host controller 104. In touchscreen embodiments, host controller 104 can be coupled to display 118, which can be positioned partially or fully behind touch sensor panel 100 or integrated with the touch sensor panel so that the touch sensor panel can cover at least a portion of the viewable area of the display. In some embodiments, touch controller 102 can include capacitive scanning system 106 for measuring the capacitance at the electrodes or pixels of touch sensor panel 100. CPU 108, along with RAM 110, ROM 112 and flash 114, can configure and control capacitive scanning system 106 under control of system clock 122 from system clock generator 116 to obtain and forward touch data to host controller 104. It should be understood that the basic architecture of touch controller 102 illustrated in FIG. 1 is only exemplary, and that other touch controller designs can be employed according to embodiments of the disclosure. For example, in mutual capacitance embodiments, the touch controller can include driving circuitry and charge pump circuitry for generating stimulation signals at a proper amplitude, frequency and phase.

Figure 2:
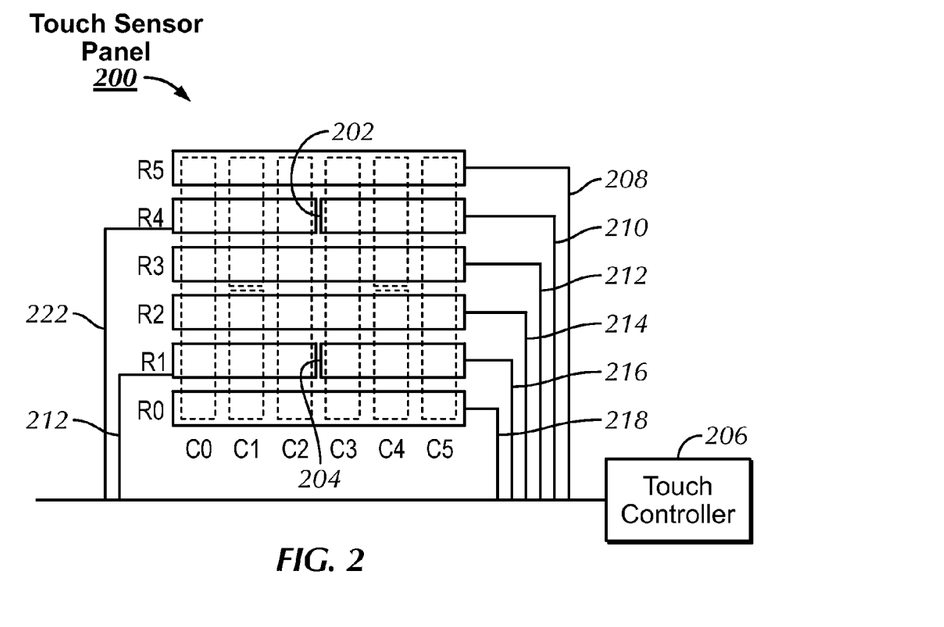
FIG. 2 illustrates an exemplary touch sensor panel according to embodiments of the disclosure.

FIG. 2 illustrates exemplary touch sensor panel 200 according to some embodiments of the disclosure. In the example of FIG. 2, touch sensor panel 200 can be configured as a projection-scan self-capacitive (i.e., projected self capacitance) touch sensor panel. In this type of touch sensor panel, each of the sensing points can be provided by an individually charged electrode or pixel that can have a certain self-capacitance to ground. As an object approaches the surface of the touch sensor panel, the object can capacitively couple to those electrodes or pixels in close proximity to the object, creating an additional capacitance to ground and effectively increasing the self-capacitance of the electrode or pixel. The amount of charge in each of the electrodes or pixels can be measured by a capacitive scanning system to determine the positions of objects in close proximity to the touch sensor panel. It should be understood that although FIG. 2 illustrates an exemplary split row self capacitance touch sensor panel, other self and mutual capacitance configurations are also possible, including but not limited to various combinations of orthogonal, non-orthogonal (e.g., axial), single and double sided arrangements for use with various types of sensor arrays and individual sensors including, but not limited to, button sensors, plate sensors (no expected human contact), proximity sensors, and the like.

The exemplary touch sensor panel of FIG. 2 includes six elongated electrodes (i.e., rows R0-R5) oriented along a first dimension. Although the touch sensor panel is shown to include six rows of electrodes, it should be understood that embodiments of the disclosure are not so limited and can include a different number of rows. One skilled in the art can easily adopt the features disclosed in the illustrated embodiment to touch sensor panels of different sizes. In the example of FIG. 2, rows R1 and R4 each include break 202, 204 that splits each of rows R1 and R4 into two subsections. The rows that are physically split into two or more subsections by breaks may be referred to as "split rows" hereinafter. The two subsections of each split row can each have a self-capacitance detected in an area over their respective subsections. As a result, a touch over one subsection can be distinguished from a touch over the other subsection. Each of the electrodes in the rows can be coupled to a touch controller 206 by one or more traces and/or wires 208, 210, 212, 214, 216, 218, 220, and 222.

When a touch is detected by both subsections of the same split row, a change in capacitance can be detected at the subsections. Because the touch is spread between the two subsections of the split row, the magnitude of the resulting change in capacitance detected by either subsection can be smaller than that of a touch detected solely by one subsection. In such an occurrence, a ratio of the capacitance changes can be calculated to reflect the breakdown of how a touch is spread over the two subsections. For example, a ratio of 20% to 80% can be interpreted as twenty percent of the touch being over one subsection and eighty percent of the touch being over the other subsection. This ratio can also be used to estimate the location of the touch over a non-split conductive region (e.g., non-split rows R0, R2, R3, and R6).

The same concept of using breaks to divide one or more row electrodes as shown in FIG. 2 and discussed above can also be incorporated into one or more of the columns of the projection-scan touch sensor panel as shown by the dashed lines in FIG. 2. Each of the electrodes in the columns can also be connected to the touch controller 206 by a corresponding trace (the column traces are not shown in FIG. 2). However, it should be understood that in other embodiments, only the rows (or only the columns) can be present.

In various embodiments, different rows and columns of a projection-scan touch sensor panel can be split into subsections as discussed above. In addition, different numbers of the rows and/or columns can be split into two or more subsections. If a row or column is split to more than two subsections, the ratio can be calculated among all of the subsections and reflect the portions of a touch over each subsection. However, the number of breaks in a projection-scan touch sensor panel can be kept to a minimum while still allowing enough data to be collected to enable the processor to disambiguate multiple touches on the panel (i.e., to avoid rotational ambiguity caused by multiple touches detected simultaneously.) One advantage of keeping the number of breaks to a minimum is that, for every additional break in a row, an extra sensor channel may be needed on the touch controller, thus increasing the size of the chipset of the touch sensor panel. This can create a problem, especially in small touch sensor panels where extra space is hard to find. Therefore, to minimize the number of breaks needed for disambiguating multiple touches, the breaks can be incorporated into certain rows and columns to ensure that a touch can always overlap with a single row split and a single column split regardless of the location of the touch on the surface of the touch sensor panel.

Figure 3:
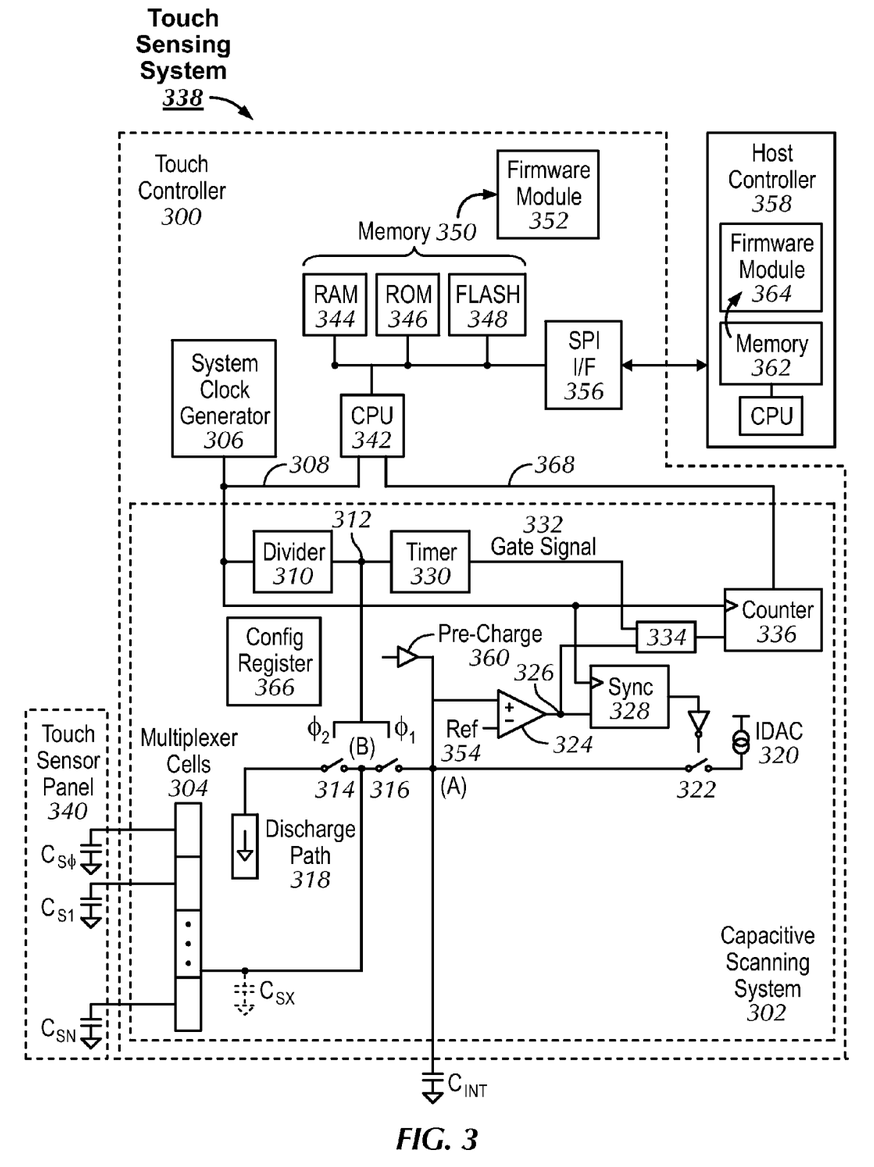
FIG. 3 provides a more detailed view of an exemplary touch sensing system including more detailed block diagrams of a touch controller and a capacitive scanning system according to embodiments of the disclosure.

FIG. 3 provides a more detailed view of exemplary touch sensing system 338 including more detailed block diagrams of touch controller 300 and capacitive scanning system 302 according to some embodiments of the disclosure. Because FIG. 3 presents a mixture of functional blocks and circuit elements for purposes of illustration only, it should be understood that other blocks and elements can be substituted. In the example of FIG. 3, the capacitances of electrodes or pixels in touch sensor panel 340 are represented by capacitances $C_{S0}$-$C_{SN}$. In some embodiments, multiplexer cells 304 within touch controller 300 can couple the capacitance of one electrode or pixel in touch sensor panel 340 to capacitive scanning system 302, represented symbolically as $C_{SX}$. However, in other embodiments, the capacitance of two or more electrodes or pixels can be coupled to capacitive scanning system 302. This can be advantageous, for example, when performing a low-power scan for which only the existence, but not the location, of a touch or near-touch is to be determined. Configuration of multiplexer cells 304 can be performed using firmware module 352 stored in one or more of RAM 344, ROM 346 and flash 348 (collectively memory 350), which can be executed to store values into a hardware register 366 for configuring and re-configuring the multiplexer cells and other scan circuits during the scanning process.

System clock generator 306 can generate system clock 308 (e.g., 24 MHz), which can be divided down by a certain amount by divider 310 to produce divided down clock 312 (e.g., 1.5 MHz). Divided down clock 312 can also control timer 330, which can produce gate signal 332 that controls the time period (gate interval) during which the capacitance $C_{SX}$ can be evaluated (e.g., 200 us). Opposite phases ($\phi1$ and $\phi2$) of divided down clock 312 produced by divider 310 can be used to control switches 314 and 316. When switch 314 is open and switches 316 and 322 are closed, capacitance $C_{SX}$ together with integration capacitance $C_{INT}$ can be charged by sourcing output digital to analog converter (IDAC) 320. When switch 314 is closed, switch 316 is open and switch 322 is closed, capacitance $C_{SX}$ can discharge through discharge path 318, and integration capacitance $C_{INT}$ can be charged by IDAC 320. When switch 314 is closed and switches 316 and 322 are open, capacitance $C_{SX}$ can continue to discharge through discharge path 318, but the integration capacitance $C_{INT}$ is no longer charged by IDAC 320. When switches 314 and 322 are open and switch 316 is closed, capacitance $C_{INT}$ can discharge into $C_{SX}$ (assuming $C_{SX}$ is substantially discharged). The various charging and discharging states summarized above are described in more detail below. The voltage at $C_{INT}$, point (A), can be coupled to the positive input of comparator 324, whose negative input can be held at configurable reference voltage 354.

A single charge/discharge cycle will now be described. Initially, after $C_{INT}$ has discharged into $C_{SX}$, both $C_{INT}$ and $C_{SX}$ can begin to charge up through current supplied by IDAC 320. At some point during charging, divider 310 can cause switch 316 to open and switch 314 to close, which can cause $C_{SX}$ to discharge through discharge path 318, while $C_{INT}$ continues to charge through IDAC 320. As $C_{INT}$ charges, if the voltage at point (A) exceeds reference voltage 354 (e.g., 1.2V) established at the negative input of comparator 324, output 326 of comparator 324 can transition to a high state. This high state on output 326 can be synchronized to system clock 308 by synchronization circuit 328. In some embodiments, synchronization circuit 328 can be a double sync circuit to delay the opening of switch 322 by several system clock periods to ensure that the voltage at point (A) exceeds reference voltage 354 by a sufficient margin as to prevent noise from toggling comparator 324. Output 326 can also be gated with gate signal 332 (using generic logic gate 334) and provided to counter 336. In some embodiments, counter 336 can begin to increment its count at the system clock rate once the voltage at $C_{SX}$ and $C_{INT}$ exceeds reference voltage 354 (i.e., after output 326 becomes asserted) and gate signal 332 is asserted (i.e., at a logic one or high voltage). Counter 336 can thereafter count up at the system clock rate as long the voltage at $C_{INT}$ remains above reference voltage 354. A high state on synchronization circuit 328 can also open switch 322, which can prevent IDAC 320 from charging $C_{INT}$ any further. When divider 310 causes switch 314 to open and switch 316 to close (with switch 322 still open), $C_{INT}$ can discharge into $C_{SX}$, and the voltage at point (A) can drop below reference voltage 354, causing comparator output 326 to go low and switch 322 to close, which can begin another charging cycle. In general, therefore, embodiments of the disclosure attempt to maintain a threshold voltage at $C_{INT}$ by sourcing current through IDAC 320 and subtracting current through $C_{SX}$.

Figure 4:
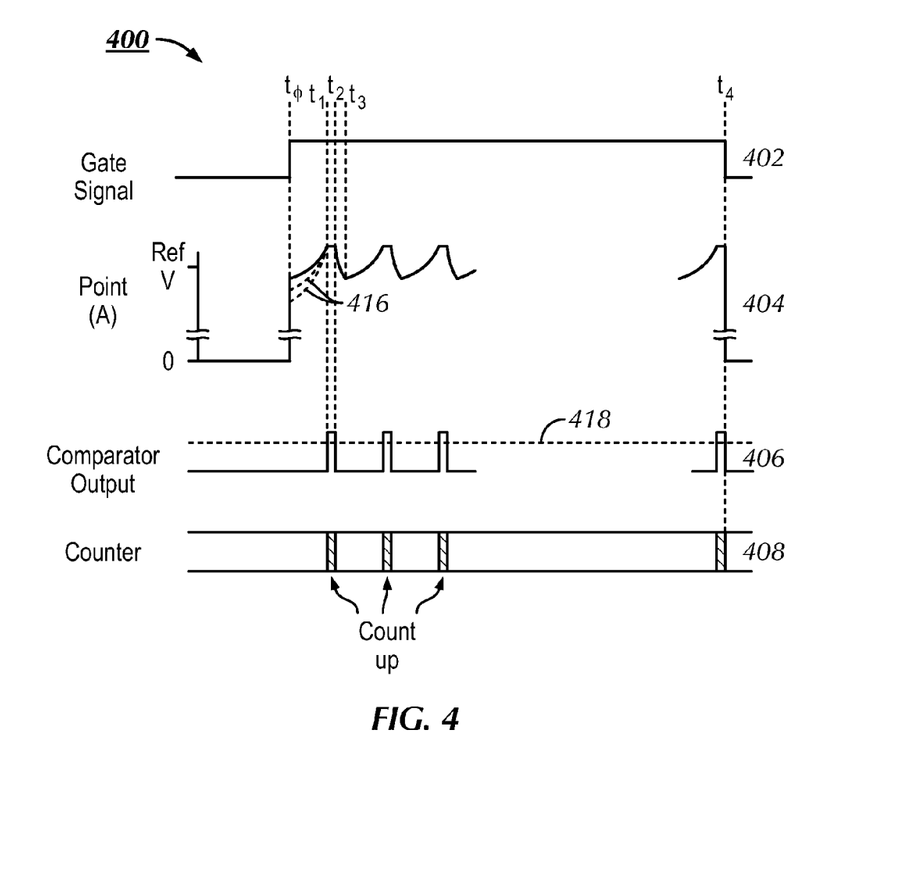
FIG. 4 illustrates an exemplary timing diagram of certain operations of FIG. 3 according to embodiments of the disclosure.

FIG. 4 illustrates exemplary timing diagram 400 of certain operations of FIG. 3 according to some embodiments of the disclosure. In the example of FIG. 4, at time t0, $C_{SX}$ and $C_{INT}$ can be pre-charged towards some pre-charge voltage 414 prior to the start of a capacitance measuring phase, although in some embodiments $C_{SX}$ and $C_{INT}$ may not actually reach the desired pre-charge voltage 414. At time t0 the gate signal can be asserted (see waveform 402), signifying the start of a capacitance measurement phase. The time during which the gate signal is asserted (e.g., t440 in FIG. 4) may also be referred to herein as the gate interval. In one embodiment, the gate interval can be about 200 microseconds. Between time t0 and t1, $C_{INT}$ (and for some of the time, $C_{SX}$) can charge up through the sourcing IDAC, and the voltage at point (A) (see waveform 404) can begin to rise. As long as the voltage at point (A) remains below the reference voltage, the comparator output (see waveform 406) will not be asserted and the counter (see waveform 408) will not be incremented. At time t1, the voltage at point (A) can exceed the reference voltage, which can cause the comparator output to transition to a high state (see waveform 406) and prevent the IDAC from charging $C_{INT}$ any further. From time t1 to time t2, $C_{INT}$ is no longer being charged, and the counter can increment its count at the system clock rate (see waveform 408). At time t2, $C_{INT}$ can discharge into $C_{SX}$. As a result, the voltage at point (A) can drop below the reference voltage, which can cause the comparator output to transition to a low state and reconnect the IDAC to $C_{SX}$ and $C_{INT}$. At time t3, $C_{SX}$ and $C_{INT}$ can once again begin to charge.

The charging, counting, and discharging operations can be repeated until time t4, when the capacitance measurement phase can end. At time t4, the number of counts N accumulated by the counter can provide an indication of the duty cycle of the comparator (see inverse duty cycle 418 in FIG. 4), and also an indication of the capacitance $C_{SX}$ being measured. Smaller values for $C_{SX}$ can result in faster charge times (e.g., t1-t0), which can further result in a greater duration of time during the gate interval at which the voltage at point (A) exceeds the reference voltage, ultimately resulting in a higher comparator inverse duty cycle 418 and a higher count per gate interval. Conversely, larger values for $C_{SX}$ can result in slower charge times (e.g., t1-t0), which can further result in fewer instances in which the voltage at point (A) exceeds the reference voltage, ultimately resulting in a lower comparator inverse duty cycle 418 and a lower count per gate interval. Because an object in close proximity with a self-capacitive sensor can increase the self-capacitance of the sensor, a lower count N can be indicative of a touch or near touch over the touch sensor panel. The count N, representative of the capacitance being measured, can be read by CPU 342 via path 368 and passed to host controller 358 through interface 356, for example. It should be understood that path 368, although symbolically illustrated by a line, can represent any communicative coupling known to those skilled in the art.

Referring again to FIG. 3, system clock 308 can be coupled to CPU 342. CPU 342, along with RAM 344, ROM 346 and flash 348, can configure and control capacitive scanning system 302 under control of system clock 308 to obtain and forward touch data to host controller 358. In some embodiments, firmware module 352 can be stored in one or more of RAM 344, ROM 346 and flash 348 (collectively memory 350), and then executed at run time to store values into hardware register 366 for configuring various parameters of capacitive sensing system 302. Configurable blocks and elements in touch controller 300 can include, but are not limited to, system clock generator 306, divider 310, timer 330, precharge buffer 360, reference voltage 354, and IDAC 320. For example, hardware register 366 can configure a trim register in system clock generator 306 for changing the system clock frequency, can configure IDAC 320 to generate a particular source current to maintain a certain comparator duty cycle during no-touch conditions, and can configure timer 330 to generate different gate intervals and gate signals 332.

In addition, a serial peripheral interface (SPI) 356 can be employed to allow host controller 358 to access reports containing information about the performance of touch controller 300. Firmware module 364 executable by host controller 358 can read and execute these reports and send communications back to touch controller 300 to make changes to the parameters of touch controller 300 during run-time. Such changes can include, but are not limited to, modifying hardware registers, RAM and flash. These changes can be made during factory calibration, repair, or maintenance, often at the direction of personnel running evaluation/calibration programs, and can also be made automatically in the field while the device is in use at the direction of firmware in host controller 358.

Referring back to FIG. 1, one common problem with touch sensor panels 100, especially touch sensor panels laminated to an LCD display device 118, is that the VCOM switching noise from the thin film transistors (TFTs) within the LCD stack can directly radiate into the touch sensor panel 100. This noise can interfere with the capacitance reading of the touch sensor panel, thereby degrading the accuracy and performance of the panel. To prevent this from happening, the touch sensor panel 100 can be scanned at a frequency that does not interfere with the VCOM switching frequency of the LCD display device 118. In one embodiment of the disclosure, the touch controller 102 can be synchronized with the LCD driver (not shown) which controls the VCOM switching of the LCD display device 118 so that the touch controller 102 can scan the touch sensor panel 100 when the LCD display 118 is not being refreshed. In other words, the scanning of the touch sensor panel 100 and the refreshing of the LCD display 118 can be performed alternately. The intervals (hereinafter referred to as the "LCM blank/idle window") between the refreshing of the LCD display 118 can be relatively short. Within this LCD blank/idle window, no VCOM switching is carried out by the LCD driver. As a result, noise generated by the LCD display can be minimized. In one embodiment, the duration of the LCM blank/idle window can be determined. During fabrication and evaluation, the touch sensor panels can be calibrated by adjusting various scanning parameters so that each full scan of the touch sensor panel can take advantage of the whole duration (or substantially all of the duration) of the LCM blank/idle window. In other words, maximum signal to noise ratio can be achieved when the touch sensor panels are calibrated so that the touch sensor panel scan is performed within each LCM blank/idle window according to this embodiment of the disclosure.

In one embodiment, within each LCM blank/idle window, the touch controller can scan each electrode forming the columns and rows of the touch sensor panel to capture their respective capacitance readings, which can then be used to generate a touch image of the touch sensor panel. This process is discussed in detail above with respect to FIGS. 3 and 4. However, the electrodes in a particular touch sensor panel may be of different sizes and shapes. For example, as shown in FIG. 2, the electrodes with no split (e.g., R0, R2, R3, and R5) are larger than the half-electrodes of the split rows (e.g., subsections of R1 and R4). In addition, some electrodes may have longer traces connecting them to the touch controller. For example, in the touch sensor panel of FIG. 2, trace 208 connecting electrode R5 to the touch controller 206 is longer than trace 218 connecting electrode R0 to the touch controller 206. Thus, the intrinsic capacitance of the electrodes and the series resistance of their respective traces can be drastically different for every electrode of the touch sensor panel. Because of that, if equal fractions of each LCM blank/idle window are allocated among the electrodes for measuring their capacitances, the resulting measurements may not be normalized with respect to each other to reflect each electrode's actual contribution to the overall capacitive measurement of the panel. Consequently, the touch image generated from these capacitive measurements may not accurately represent the actual touch.

In one embodiment, a calibration process can be provided during the fabrication and evaluation of the touch sensor panels to maximize the SNR by setting up the amount of time allocated for scanning each electrode as a function of the capacitance contribution from that electrode to the total capacitance of all the electrodes of the panel. That is, instead of allocating equal shares of the LCM blank/idle window for each electrode, a fraction of the LCM blank/idle window that is proportional to each individual electrode's contribution to total panel capacitance can be allocated for scanning the particular electrode. As a result, a larger portion of the LCM blank/idle window can be allocated for scanning channels having relatively large capacitance to ground and, in contrast, a smaller portion of the LCM blank/idle window can be allocated for scanning channels having relatively small capacitance to ground.

Figure 5:
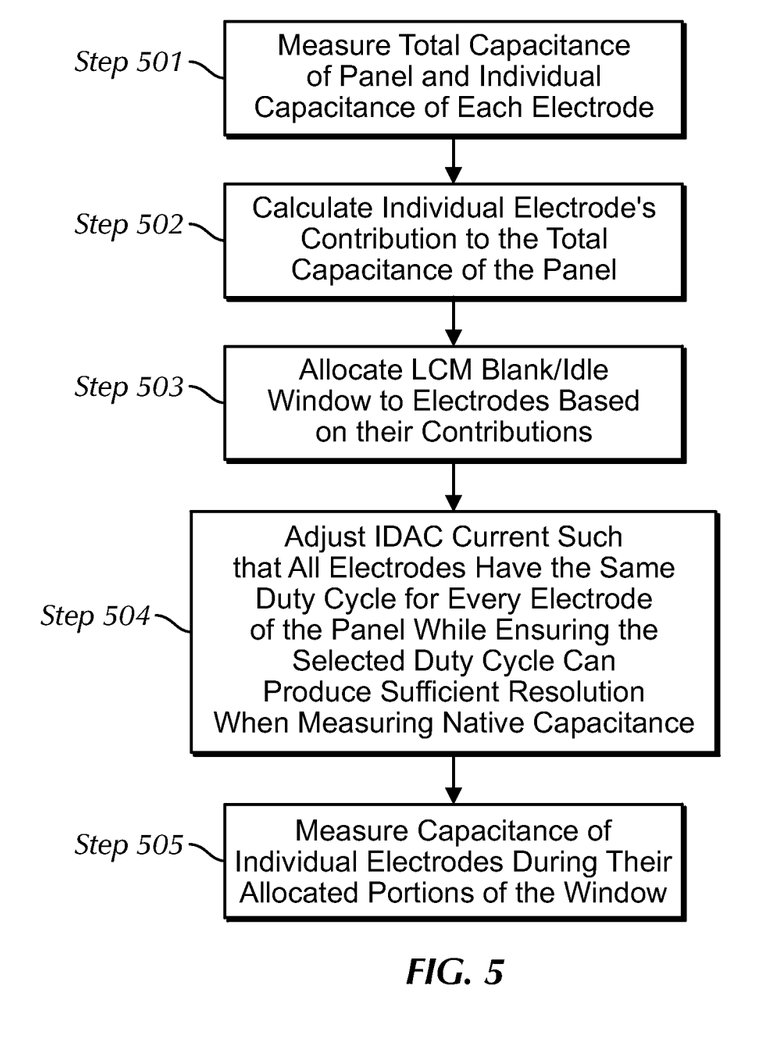
FIG. 5 illustrates the exemplary steps of a calibration process according to embodiments of the disclosure.

FIG. 5 illustrates exemplary steps of a calibration process for providing maximum SNR on electrodes regardless of the electrode's capacitance to ground by allocating the amount of time available for touch sensor panel scan (i.e., the LCM blank/idle window) to each electrode in proportion to the electrode's relative capacitance to the total capacitance measured from the panel. The calibration process of FIG. 5 can be performed by a processor programmed by firmware. In this embodiment, first a default scan can be set up by applying a fixed set of scan parameters to the entire panel to record a baseline measurement of the total capacitance of the whole panel (i.e., the sum of the capacitance of each electrode of the panel) and the individual capacitance of each electrode. (Step 501) For example, it can be set up such that each electrode can have a 200 ms scan with the same IDAC value. The individual capacitance of each electrode can be divided into the total capacitance of the panel to calculate the electrode's contribution as a percentage of the total capacitance. (Step 502) The same percentage of the LCM blank/idle window can then be allocated as the scan time for that electrode. (Step 503) Then, the IDAC current can be adjusted for every electrode of the touch sensor panel to yield uniform duty cycle while ensuring sufficient resolution for measuring native capacitances. (Step 504) Essentially, the process ensures that the capacitance measurements of the electrodes are normalized to account for the differences in their intrinsic capacitance. Finally, during their respective allocated portions of the LCM blank/idle window, the electrodes can be scanned to obtain measurements of their capacitance, which can be used by the application as a known undisturbed capacitance reference of each of the sensors. (Step 505) By incorporating the above-described calibration steps in the fabrication process of the touch sensor panels, uniform sensitivity can be achieved for all electrodes in a touch sensor panels and across different touch sensor panels regardless of the location of the electrodes and who is using the touch sensor panels.

In some embodiments, the above-described calibration process can be performed at the factory during fabrication and evaluation of the touch sensor panels. In other embodiments, calibration can be performed by firmware installed on the individual devices at runtime. For example, a runtime algorithm can be set to run when the firmware first boots and the host device has not been factory calibrated. The runtime calibration can dynamically adjust the IDAC current such that all electrodes have the same duty cycle as well as allocate the measurement time for each electrode in a manner proportional to the electrode's relative capacitance to the entire panel. The runtime calibration, in some applications, can remove the need for factory calibration, saving manufacturing time. Additionally, it makes it possible to produce a functional device prior to the calibration stage in the factory, thereby providing more flexibility with regard to where the factory calibration stage can be carried out during the manufacturing process.

In another embodiment, a software gain can be added to each channel so that all channels of the touch sensor panel can perform uniformly with a panel stimulus without regard to each electrode's actual capacitance to ground.

Another aspect of the calibration process can involve determining the optimal duty cycle so that the performance of the touch sensor panel is not significantly affected by external conditions such as changes in temperature and humidity. Touch sensor panels can be heavily dependent on ambient conditions, such as temperature and humidity. Any change in temperature and humidity can drastically impact the intrinsic capacitance of the entire sensor. For example, as the external temperature rises, the capacitance of the electrodes of the touch sensor panel can increase. If the capacitance reaches or passes a certain threshold, the touch sensor panel can gradually lose its sensitivity. At that point, the touch sensor panel may not be able to detect any changes in capacitance even when there is a touch on the panel. Thus, during calibration, the capacitance of the sensor at ambient conditions can be calibrated to a certain duty cycle that can accommodate external conditions such as temperature and humidity changes. Without this calibration step, the temperature/humidity changes can cause the scan to be completely saturated so the touch sensor panel is not able to sense any change in capacitance of the electrodes.

According to one embodiment of the disclosure, calibration of the touch sensor panel can be performed to determine an optimal duty cycle. Ideally, if the host device including the touch sensor panel is always used in ambient conditions, the duty cycle can be optimally set to nearly 100%, which can provide the best touch sensitivity for the panel, at least in theory. As illustrated in FIG. 3 and discussed above, the duty cycle can correspond to how often the IDAC is turned on. If the temperature and/or humidity increases, the duty cycle can also increase such that some of the electrodes which have a large internal capacitance can start to lose sensitivity to changes in capacitance caused by touches on the panel. Therefore, to ensure that the panel scan is not saturated, i.e., the duty cycle is not above 100%, the duty cycle can be set to an optimal number, for example, 80%, at ambient conditions. By making this adjustment to the duty cycle, the calibration process can ensure that the touch sensor panel can remain functional even when external conditions change, thereby achieving consistent performance throughout the touch sensor panel.

The optimal duty cycle can be determined by experimenting with different duty cycles. This can be done by adjusting various parameters in the firmware of the touch sensor panel at various conditions and monitoring the performance of the touch sensor panel. By adjusting these parameters, an optimal margin in the duty cycle can be determined which can allow the touch sensor panel to function in different operating conditions without sacrificing significant SNR.

Figure 6:
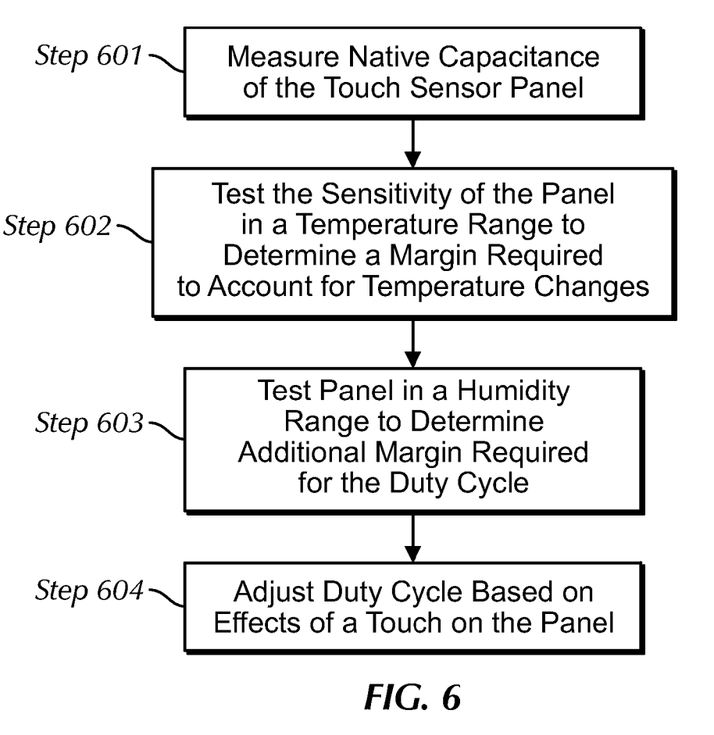
FIG. 6 illustrates the exemplary steps of one method for determining an optimal duty cycle during calibration of a touch sensor panel according to embodiments of the disclosure.

The exemplary steps of one method for determining the optimal duty cycle are shown in FIG. 6. First, the native capacitance of the touch sensor panel can be measured and scan parameters adjusted to ensure that the electrodes of the panel can be discharged at ambient temperature and humidity (e.g., 25° C. and 20% humidity). (Step 601) Essentially, the touch sensor panel can be calibrated so that a normal scan can take place at ambient conditions. The full amount of time required to discharge each electrode can be determined under these conditions. Next, the sensitivity of the panel can be tested within the desired thermal operating range (e.g., −25° C.-40° C.) to determine the maximum duty cycle which can be achieved over the temperature range. (Step 602) Similarly, the touch sensor panel can be tested within a humidity range (e.g., 0-100%) to determine the maximum duty cycle that can be maintained without losing sensitivity within the humidity range. (Step 603) After these tests, a duty cycle can be determined by including margin to accommodate changes in temperature and humidity with the goal of ensuring that the touch sensor panel can perform normally under these conditions. In addition, this duty cycle can be further adjusted based on the effects of a touch on the panel. (Step 604) For example, the duty cycle can be lowered further to ensure that if a large capacitance is applied to the panel, the duty cycle would still not exceed 100%.

In general, the above-disclosed embodiments of the calibration process can ensure that touch sensor panels fabricated using the same process will perform uniformly and normally under any operation conditions.

Figure 7A:
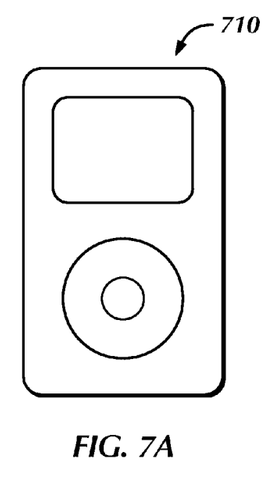
FIG. 7a illustrates an exemplary digital media player that can include a touch sensing system according to embodiments of the disclosure.

FIG. 7a illustrates exemplary digital media player 710 that can include a touch sensing system according to embodiments of the disclosure.

Figure 7B:
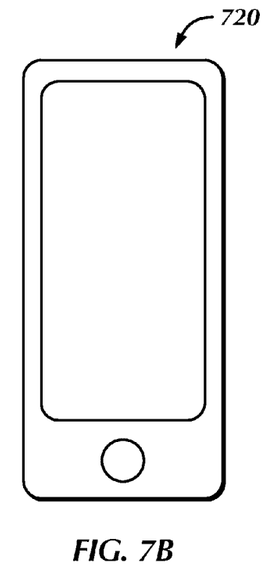
FIG. 7b illustrates an exemplary mobile telephone that can include a touch sensing system according to embodiments of the disclosure.

FIG. 7b illustrates exemplary mobile telephone 720 that can include a touch sensing system according to embodiments of the disclosure.

Figure 7C:
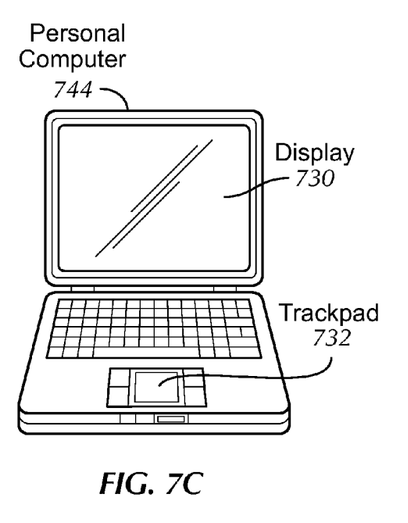
FIG. 7c illustrates an exemplary personal computer that can include a touch sensing system according to embodiments of the disclosure.

FIG. 7c illustrates an exemplary personal computer 744 that can include touch sensor panel 724 and display device 730. The touch sensor panel 724 can be part of a touch sensing system according to embodiments of the disclosure.

Referring again to FIG. 1, capacitive sensing system 120 can perform actions that can include, but are not limited to, moving an object such as a cursor or pointer, scrolling or panning through lists, photos or other media items, adjusting control settings, opening a file or document, viewing a menu, making a selection, executing instructions, operating a peripheral device coupled to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host controller 104 can also perform additional functions that may not be related to touch sensing, and can be coupled to program storage and display 118 such as an LCD panel for providing a UI to a user of the device.

Note that one or more of the functions described above can be performed by firmware stored in memory (e.g., memory 350 or memory 360 in FIG. 3) and executed by touch controller 300 or host controller 358. The firmware can also be stored and/or transported within any computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable storage medium" can be any medium that can contain or store the program for use by or in connection with the instruction execution system, apparatus, or device. The computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport readable medium can include, but is not limited to, an electronic, magnetic, optical, electromagnetic or infrared wired or wireless propagation medium.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. An apparatus for calibrating a touch sensor panel including a plurality of touch electrodes, the apparatus comprising a processor programmed for:
    measuring individual capacitances of each of the touch electrodes by scanning each of the touch electrodes for a same duration;
    computing a total capacitance of the touch sensor panel from the individual capacitances;
    determining a percentage contribution of each of the plurality of touch electrodes to the total capacitance of the touch sensor panel; and
    scanning each touch electrode for a fraction of a touch sensing time period proportional to the percentage contribution of that electrode to the total capacitance of the touch sensor panel.

2. The apparatus of claim 1, wherein the processor is further programmed for scanning one or more of the plurality of electrodes to obtain the capacitance of the electrodes during the respective portion of the touch sensing time period.

3. The apparatus of claim 2, wherein the processor is further programmed for creating a touch image from the obtained capacitance of the electrodes.

4. The apparatus of claim 1, wherein the portion of the touch sensing time comprises a LCM black window.

5. The apparatus of claim 1, wherein the processor is further programmed for applying a fixed set of scan parameters to all of the electrodes of the touch sensor panel to record a baseline measurement of the total capacitance and capacitance of each of the plurality of touch electrodes.

6. The apparatus of claim 1, wherein determining a percentage contribution of each of the plurality of touch electrodes further comprises dividing the capacitance of each of the plurality of electrodes by the total capacitance.

7. A method for calibrating a touch sensor panel including a plurality of touch electrodes, the method comprising:
    measuring individual capacitances of each of the touch electrodes by scanning each of the touch electrodes for a same duration;
    computing a total capacitance of the touch sensor panel from the individual capacitances;
    determining, for each of the plurality of touch electrodes, a contribution in terms of capacitance to the total capacitance of the touch sensor panel; and
    scanning each touch electrode for allocating a fraction of a fixed period of time for measuring a capacitance of each of the plurality of electrodes based on, the fixed period of time proportional to the electrode's contribution to the total capacitance.

8. The method of claim 7, wherein the fixed period of time comprises a LCM blank window.

9. The method of claim 7, wherein the fraction of the fixed period of time allocated to each of the plurality of electrodes is proportional to the electrode's contribution to the total capacitance.

10. The method of claim 7, further comprising selecting a duty cycle for each of the plurality of electrodes of the touch sensor panel.

11. The method of claim 10, further comprising applying a fixed set of scan parameters to all of the electrodes of the touch sensor panel to record a baseline measurement of the total capacitance and capacitance of each of the plurality of electrodes.

12. The method of claim 11, wherein determining, for each of the plurality of touch electrodes, contribution in terms of capacitance to a total capacitance of the touch sensor panel further comprises dividing the capacitance of each of the plurality of electrodes by the total capacitance.

13. The method of claim 7, further comprising scanning one or more of the plurality of electrodes to obtain the capacitance of the electrodes during the respective fraction of the fixed period of time allocated to the electrode.

14. The method of claim 13, further comprising creating a touch image from the obtained capacitance of the electrodes.

15. A non-transitory computer readable storage medium storing instructions executed by a processor for calibrating a touch sensor panel including a plurality of touch electrodes, the instructions comprising:
    measuring individual capacitances of each of the touch electrodes by scanning each of the touch electrodes for a same duration;
    computing a total capacitance of the touch sensor panel from the individual capacitances;
    determining, for each of the plurality of touch electrodes, a contribution in terms of capacitance to the total capacitance of the touch sensor panel; and
    scanning each touch electrode for a fraction of a fixed period of time for measuring a capacitance of each of the plurality of electrodes based on, the fixed period of time proportional to the electrode's contribution to the total capacitance.

16. The non-transitory computer readable storage medium of claim 15, further comprising selecting a duty cycle for each of the plurality of electrodes of the touch sensor panel.

17. The non-transitory computer readable storage medium of claim 15, further comprising applying a fixed set of scan parameters to all of the electrodes of the touch sensor panel to record a baseline measurement of the total capacitance and capacitance of each of the plurality of electrodes.

18. The non-transitory computer readable storage medium of claim 15, further comprising scanning one or more of the plurality of electrodes to obtain the capacitance of the electrodes during the respective fraction of the fixed period of time allocated to the electrode.

19. The non-transitory computer readable storage medium of claim 18, further comprising creating a touch image from the obtained capacitance of the electrodes.

* * * * *